United States Patent [19]
Dolhert

[11] Patent Number: 5,256,609
[45] Date of Patent: Oct. 26, 1993

[54] CLEAN BURNING GREEN CERAMIC TAPE CAST SYSTEM USING ATACTIC POLYPROPYLENE BINDER

[75] Inventor: Leonard E. Dolhert, Clarksville, Md.

[73] Assignee: W. R. Grace & Co.-Conn., New York, N.Y.

[21] Appl. No.: 809,748

[22] Filed: Dec. 18, 1991

[51] Int. Cl.$^5$ ............................................. C04B 35/56
[52] U.S. Cl. ....................... 501/96; 264/63; 264/65; 156/89; 501/5; 501/127
[58] Field of Search ............. 264/63, 65; 525/240; 501/127, 96, 20, 5, 98; 156/89

[56] References Cited

U.S. PATENT DOCUMENTS

| | | | |
|---|---|---|---|
| 4,752,531 | 6/1988 | Steinberg | 428/426 |
| 4,882,110 | 11/1989 | Kramer et al. | 264/63 |
| 5,024,975 | 6/1991 | Hartmann | 501/65 |
| 5,127,158 | 7/1992 | Nakano | 29/849 |

OTHER PUBLICATIONS

Powder Processing for Microstructural Control in Ceramic Superconductors by M. J. Cima, W. E. Rhine, Ceramics Processing Research Laboratory, Materials Processing Center Massachusetts Institute of Technology, 1987 Cambridge Mass. 02139

Primary Examiner—Mark L. Bell
Assistant Examiner—A. Wright
Attorney, Agent, or Firm—Steven Capella

[57] ABSTRACT

Green ceramic formulations comprising an atactic polypropylene-containing binder are suitable for tape casting and can be effectively removed during thermal processing in reducing atmospheres. The binder may be removed in substantially dry reducing atmosphere. The tapes may be used for forming ceramic substrates and metallized ceramics such as those used in electronic packaging.

12 Claims, No Drawings

CLEAN BURNING GREEN CERAMIC TAPE CAST SYSTEM USING ATACTIC POLYPROPYLENE BINDER

BACKGROUND OF THE INVENTION

In making ceramic-based electronic packages for housing integrated circuits and in the production of other ceramic products, it is often desirable to have the option of using a reducing atmosphere for thermal processing of the ceramic material(s). In some circumstances, the use of a reducing atmosphere may be necessary to avoid unwanted oxidation (of the ceramic and/or any co-fired metals) and to obtain a useful product.

In the manufacture of many ceramic products, such as ceramic-based electronic packages, the ceramic powder is combined with a binder and formed into a green ceramic tape. Metals may optionally be placed on the tape surface and/or at locations in the tape by known metallization techniques. A series of the green tapes are then laminated and fired to produce a densified ceramic product (e.g. a dense ceramic base for use in an electronic package.)

Green ceramic tapes can be formed in a variety of ways such as by tape casting or by extrusion. Tape casting is the most widely used and generally preferred technique from an economic standpoint.

When green ceramic tapes are used to form dense ceramic products, the binder in the green tape is typically removed during thermal processing of the tape laminate. While complete removal of the binder is generally preferred (especially for ceramics used in electronic packaging), often residual material such as components and/or reaction products from the binder can remain in the ceramic. For organic binders, a typical residual material is elemental carbon. Residual elemental carbon is generally a less prevalent problem for ceramics that are processed in oxidizing atmospheres. Oxygen can react with the binder and/or residual carbon to form gaseous materials that can escape from the green tape laminate.

For ceramics processed in reducing atmospheres, the problem of residual materials (e.g. carbon) is more difficult to overcome Generally, effective binder removal can only be accomplished by use of some sort of binder removal catalyst, by use of a prolonged low temperature heating schedule, by use of wet gas atmospheres (e.g. U.S. Pat. No. 4,234,367) or by use of a special binder.

Catalysts add expense to the process and may also leave undesirable trace materials (especially if the ceramic is to be used in electronic packaging.) Prolonged heating schedules add significantly to the cost of production and may only be marginally effective. Wet gases, even when they contain hydrogen, may produce undesired oxidation and/or may require elaborate control of heating and atmosphere conditions. While special binder systems have been used to overcome this problem (e.g. polyethylene used in U.S. Pat. No. 4,920,640), such special binders are generally not amenable to formation of green tapes by tape casting.

Accordingly, there remains a need for green tape formulations which are amenable to tape casting and which can be effectively removed from a green ceramic laminate during thermal processing in reducing atmospheres without the use of catalysts, prolonged heating schedules or wet gases.

SUMMARY OF THE INVENTION

The invention provides green ceramic formulations suitable for tape casting which contain binders that can be effectively removed during thermal processing in reducing atmospheres. The invention further provides improved methods for making dense ceramic products using reducing atmospheres for thermal processing.

In one aspect, the invention encompasses a green ceramic composition for casting green ceramic tape, the composition comprising:
 a) ceramic particles, and
 b) an atactic polypropylene-containing binder.

In a further aspect, the composition may also comprise:
 c) a dispersant,
 d) a plasticizer, and
 e) a solvent.

The invention also encompasses a method for forming a dense ceramic, the method comprising:
 a) combining ceramic powder, a dispersant, a plasticizer, a solvent and atactic polypropylene-containing binder to form a slip,
 b) casting the slip onto a sheet to form a tape,
 c) recovering the tape from the sheet, and
 d) heating the tape to remove the binder and densify the ceramic.

The heating is preferably done in a reducing atmosphere, especially for AlN ceramics. The method may also include forming a laminate containing a plurality of tape layers which is processed in step d) to produce a ceramic product. The tape layers may be metallized prior to lamination. In a more specific aspect, the invention also encompasses forming dielectric ceramic bases useful in electronic packaging using the tape formulation and method of the invention. The ceramic particles are preferably selected from the group consisting of alumina, aluminum nitride, mullite, glass-ceramics, glasses and mixtures thereof.

DETAILED DESCRIPTION OF THE INVENTION

The green ceramic composition for casting green ceramic tape comprise:
 a) ceramic particles, and
 b) an atactic polypropylene-containing binder.

The compositions preferably further comprise:
 c) a dispersant,
 d) a plasticizer, and
 e) a solvent.

The ceramic particles may be any ceramic material (e.g. alumina, aluminum nitride, mullite, glass-ceramics and glasses, or mixtures thereof). The particles are preferably of a suitable size to facilitate densification and other processing steps which the tape may undergo. For example, in forming electronic packaging, the tape may be punched or have metallization screened on its surface.

A atactic polypropylene-containing binder may be atactic polypropylene or a copolymer thereof. A preferred atactic polypropylene binder is an atactic polypropylene/polybutene copolymer made by Eastman Chemical Company under the name Eastman D-7682. The amount of binder used is preferably kept to the minimum necessary to produce a useful green tape. The binder preferably forms about 20–60 wt. % of the tape composition based on the weight of the ceramic particles.

The tape composition preferably contains a dispersant to facilitate mixing of the binder and ceramic particles. The dispersant may be any dispersant which is compatible with the other ingredients of the tape composition and does not leave any undesired residue in subsequent processing. A dispersant sold by Chevron Corporation as OLOA ® 1200 is a preferred dispersant. Dispersants Kellox ®Z3 sold by Spencer Kellog, Inc., Shellflex ® H300 sold by Shell Chemical Co., and Amoco H300 sold by Amoco Chemical Co. may also be usable dispersants. The dispersant OLOA ® 1200 is believed to be proprietary dispersant which is dissolved in an oil. Mixtures of suitable dispersants may be used if desired. As with the binder, the amount of dispersant used is preferably the minimum necessary to easily achieve a usable tape. Preferably, the dispersant forms about 0.25-2.0 wt. % of the composition based on the weight of the ceramic particles.

The tape composition also may contain a plasticizer which generally improves the workability of the tape before and after casting. The plasticizer should be compatible with the other ingredients of the tape composition and should not leave any undesired residue in subsequent processing. Any appropriate plasticizer may be used. Preferred plasticizers are oils. The oil contained in additive OLOA ® 1200 is preferably used to plasticize the binder. Mixtures of appropriate plasticizers may be used. As with the binder, the amount of plasticizer used is preferably the minimum necessary to easily achieve a workable tape. Preferably, the plasticizer forms about 0.5-10 wt. % of the composition based on the weight of the ceramic particles.

The tape composition preferably further contains a solvent. The solvent should be compatible with the other ingredients of the tape composition and should not leave any undesired residue in subsequent processing. Toluene is a preferred solvent. As with the binder, the amount of solvent used is preferably the minimum necessary to easily achieve a workable tape. Preferably, the solvent forms about 25-80 vol. % of the composition based on the total slip volume.

The green tape composition may further include any other appropriate expedients known in the tape casting art.

The method of the invention comprises:
a) combining ceramic powder, a dispersant, a plasticizer, a solvent and atactic polypropylene-containing binder to form a slip,
b) casting the slip onto a sheet to form a tape,
c) recovering the tape from the sheet, and
d) heating the tape to remove the binder and densify the ceramic.

The heating step d) is preferably done in a reducing atmosphere, especially for AlN-containing ceramics. The slip may be de-aired by applying a vacuum to the slip prior to casting step b).

Recovering step c) preferably includes the steps:
i) drying the tape, and
ii) separating the tape from the sheet.

If a multi-layered ceramic base for use in electronic packaging is desired, a plurality of tapes may be laminated together prior to heating step d). The tape recovered in step c), may optionally be treated to add any appropriate metallization prior to step d). Examples of useful methods for forming ceramic bases from green tapes are disclosed in U.S. Pat. Nos. 4,920,640 and 5,017,434 as well as in U.S. Pat. application Ser. No. 631,577, filed Dec. 21, 1990 and Ser. No. 702,562, filed May 20, 1991, the disclosures of which are incorporated herein by reference.

Typical reducing atmospheres are substantially dry atmospheres comprising about 3-5% $H_2$ (based on the total pressure) with the balance being a neutral gas such as $N_2$ or Ar, however the invention is not limited to the use of any particular reducing atmosphere.

In performing the method of the invention, the tape formulation used is preferably one of those described above.

The following examples are presented to further illustrate the invention. The invention is not limited to any of the specific details of the examples.

EXAMPLE 1

An AlN/glass green tape was prepared as follows:
a) 222 parts (by weight) of ceramic powder were ball milled for 8 hours together with 2 parts dispersant/plasticizer, 173 parts solvent, and 52 parts of binder to form a well dispersed slip;
b) the slip was de-aired by applying a vacuum and cast onto a Mylar ® sheet using a doctor blade; and
c) the cast slip was dried and separated from the Mylar ® sheet to produce a green tape.

The ceramic powder contained 34 wt. % AlN and 66 wt. % borosilicate glass. The dispersant/plasticizer was Kellox ®Z3. The solvent was toluene. The binder was atactic polypropylene/polybutene copolymer.

EXAMPLE 2

An AlN green tape was prepared as follows:
a) 100 parts (by weight) of ceramic powder were ball milled for 8 hours together with 2 parts dispersant/plasticizer, 173 parts solvent, and 52 parts of binder to form a well dispersed slip;
b) the slip was de-aired by applying a vacuum and cast onto a Mylar ® sheet using a doctor blade; and
c) the cast slip was dried and separated from the Mylar ® sheet to produce a green tape.

The ceramic powder contained 96.5 wt. % AlN and 3.5 wt. % $CaCO_3$. The dispersant/plasticizer was OLOA ®1200. The solvent was toluene. The binder was an atactic polypropylene/polybutene copolymer.

What is claimed is:
1. A method of forming a dense ceramic article, said method comprising:
a) forming a slip consisting essentially of ceramic particles, a dispersant, a plasticizer, a solvent and a binder selected from the group consisting of atactic polypropylene and atactic polypropylene copolymers,
b) casting said slip onto a sheet to form a tape,
c) drying said tape,
d) separating said dried tape from said sheet to recover said tape, and
e) heating said recovered tape in a reducing atmosphere to remove said binder and densify said ceramic.

2. The method of claim 1 wherein said solvent is toluene.

3. The method of claim 1 wherein said slip formed in step a) consists essentially of about 25-80 vol. % solvent and, in parts by weight, about:
a) 100 parts of said ceramic particles,
b) 20-60 parts of said binder,
c) 0.25-2 parts of said dispersant, and
d) 0.5-10 parts of aid plasticizer.

4. The method of claim 1 wherein said slip is de-aired by applying a vacuum to said slip prior to said casting step b).

5. The method of claim 1 wherein said ceramic particles are selected from the group consisting of alumina, aluminum nitride, mullite, glass-ceramics, glasses and mixtures thereof.

6. The method of claim 1 wherein said binder is an atactic polypropylene/polybutene copolymer.

7. A method for forming a dense ceramic article, said method comprising:
   a) forming a slip consisting essentially of ceramic particles, a dispersant, a plasticizer, a solvent and a binder selected from the group consisting of atactic polypropylene and atactic polypropylene copolymers,
   b) casting said slip onto a sheet to form a tape,
   c) drying said tape and recovering said dried tape from said sheet,
   d) laminating said recovered tape with other layers of green ceramic tape, and
   e) heating said tape laminate in a reducing atmosphere to remove said binder and densify said ceramic.

8. The method of claim 7 wherein metallization is applied to at least one layer of said laminate prior to step d).

9. The method of claim 8 wherein said ceramic particles are selected from the group consisting of alumina, aluminum nitride, mullite, glass-ceramics, glasses and mixtures thereof.

10. The method of claim 7 wherein said binder is an atactic polypropylene/polybutene copolymer.

11. The method of claim 7 wherein said slip is de-aired by applying a vacuum to said slip prior to said casting step b).

12. The method of claim 7 wherein said reducing atmosphere is substantially dry and comprises about 3–5% Hz based on total pressure with the balance being selected from the group consisting of nitrogen, argon, and mixtures thereof.

* * * * *